US 11,328,062 B2

United States Patent
Canedo et al.

(10) Patent No.: US 11,328,062 B2
(45) Date of Patent: May 10, 2022

(54) CRITICAL INFRASTRUCTURE FORENSICS

(71) Applicant: Siemens Aktiengesellschaft, Munich (DE)

(72) Inventors: Arquimedes Martinez Canedo, Plainsboro, NJ (US); Justinian Rosca, West Windsor, NJ (US); Sanjeev Srivastava, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 291 days.

(21) Appl. No.: 16/331,680

(22) PCT Filed: Sep. 19, 2016

(86) PCT No.: PCT/US2016/052439
§ 371 (c)(1),
(2) Date: Mar. 8, 2019

(87) PCT Pub. No.: WO2018/052446
PCT Pub. Date: Mar. 22, 2018

(65) Prior Publication Data
US 2019/0197238 A1    Jun. 27, 2019

(51) Int. Cl.
*G06F 21/56*    (2013.01)
*G06F 21/55*    (2013.01)

(52) U.S. Cl.
CPC .......... *G06F 21/566* (2013.01); *G06F 21/554* (2013.01); *G06F 2221/034* (2013.01)

(58) Field of Classification Search
CPC ................. G06F 21/566; G06F 21/554; G06F 2221/034; G06F 21/32; G06F 21/755; G06F 21/552; G06F 21/567; G06F 2221/033; G01R 31/2887; G01R 31/2832; G01R 31/2893; G01R 21/00; G01R 31/2891; G01R 1/408; G01R 31/286; G01R 31/001; G01R 1/0408; G01R 31/2886
See application file for complete search history.

(56) References Cited

U.S. PATENT DOCUMENTS

| | | | |
|---|---|---|---|
| 8,607,351 B1 | 12/2013 | Wang et al. | |
| 9,268,938 B1* | 2/2016 | Aguayo Gonzalez | ...................... G01R 31/2891 |
| 9,697,355 B1* | 7/2017 | Park | ...................... G06F 21/552 |
| 2012/0180126 A1 | 7/2012 | Liu et al. | |
| 2012/0284791 A1* | 11/2012 | Miller | ...................... G06N 7/005 726/22 |

(Continued)

OTHER PUBLICATIONS

International Search Report dated May 30, 2017; Application No. PCT/US2016/052439; Filing Date: Sep. 19, 2016; 16 pages.

*Primary Examiner* — Matthew Smithers
*Assistant Examiner* — Shu Chun Gao

(57) ABSTRACT

A computer-implemented method for detecting cyber-attacks affecting a computing device includes retrieving a plurality of sensor datasets from a plurality of sensors, each sensor dataset corresponding to involuntary emissions from the computing device in a particular modality and extracting a plurality of features from the plurality of sensor datasets. One or more statistical models are applied to the plurality of features to identify one or more events related to the computing device. Additionally, a domain-specific ontology is applied to designate each of the one or more events as benign, failure, or a cyber-attack.

18 Claims, 6 Drawing Sheets

(56) References Cited

U.S. PATENT DOCUMENTS

| | | | |
|---|---|---|---|
| 2013/0191052 A1* | 7/2013 | Fernandez | G06F 17/00 702/60 |
| 2014/0337974 A1* | 11/2014 | Joshi | H04L 63/1425 726/23 |
| 2015/0295945 A1* | 10/2015 | Canzanese, Jr. | H04L 63/145 726/23 |
| 2015/0317990 A1* | 11/2015 | Fousek | G10L 19/26 704/500 |
| 2015/0358337 A1* | 12/2015 | Keller | G06F 11/00 726/23 |
| 2015/0381649 A1* | 12/2015 | Schultz | H04L 63/1433 726/25 |
| 2016/0065603 A1* | 3/2016 | Dekel | H04L 63/14 726/23 |
| 2016/0098561 A1* | 4/2016 | Keller | G06F 21/554 726/24 |
| 2016/0127931 A1* | 5/2016 | Baxley | H04W 12/08 455/67.16 |
| 2016/0354053 A1* | 12/2016 | Tsai | A61B 5/7275 |

\* cited by examiner

US 11,328,062 B2

CRITICAL INFRASTRUCTURE FORENSICS

This application is a national phase filing under 35 U.S.C. § 371 of International Patent Application No. PCT/US2016/052439, filed Sep. 19, 2016, which is incorporated herein by reference in its entirety.

TECHNICAL FIELD

The present invention relates generally to methods, systems, and apparatuses related to critical infrastructure forensics (CIF). The disclosed technology may be applied to, for example, detect cyber-attacks on a device based on that device's unintended analog emissions.

BACKGROUND

Critical Infrastructure Components (CICs) are physical and computer-based systems that are essential to the functions of an organization. The term "organization" here is used broadly to refer to any group including, for example, businesses, cities, and countries. It is vital that any cyber-attacks on CICs be detected so that the rest of the organization does not become compromised. Conventional CIC security techniques may be classified in two main categories: analog-digital and physical-analog.

The analog-digital methods utilize analog emissions that are intentionally omitted for diagnostic or security purposes, captured, and converted to digital signals for monitoring. Such methods are generally undesirable because they require changes to the CIC and often do not identify more sophisticated cyber-attacks. For example, if the cyber-attack comprises the device emitting the analog emissions or the attack compromises the CIC without affecting the operation of the emitting device, the attack could go undetected.

The physical-analog methods leverage the involuntary or unintended emissions. Such methods are generally limited in terms of the number and types of emission modalities that are analyzed. This results in an incomplete view of the CIC's operation and, thus, its security. Moreover, conventional physical-analog are intrusive in nature because they require physical contact to the CIC being monitored. Thus, they lack the security provided by an air gapped system.

Accordingly, it is desired to provide a CIC cyber-attack detection mechanism that is air gapped, non-intrusive, and utilizes various available emissions associated with the component.

SUMMARY

Embodiments of the present invention address and overcome one or more of the above shortcomings and drawbacks, by providing methods, systems, and apparatuses related to critical infrastructure forensics. More specifically, the techniques described herein may be used to detect cyber-attacks targeting Critical Infrastructure Components (CIC) using unintended analog emissions of the CIC such as noise, vibration, motion, heat, electro-magnetic (EM) interference, and radio frequency.

According to some embodiments, a computer-implemented method for detecting cyber-attacks affecting a computing device includes retrieving a plurality of sensor datasets from a plurality of sensors, each sensor dataset corresponding to involuntary emissions from the computing device in a particular modality. These the sensor datasets may each be retrieved, for example, using a sensor that is external to the computing device and separated from the computing device by an air gap. In some embodiments, the sensor dataset comprises data from one or more acoustic, video, thermal, electromagnetic, and radiofrequency modalities. A plurality of features is extracted from the sensor datasets, for example using a nonlinear convolutional network comprising a scattering network and/or a semi-discrete convolutive network. During feature extraction, a deep propagation network may be used to fuse features derived from each particular modality. One or more statistical models are applied to the features to identify one or more events related to the computing device. Additionally, a domain-specific ontology is applied to designate each of the one or more events as benign, failure, or a cyber-attack.

According to another aspect of the present invention, a system for detecting cyber-attacks affecting a computing device, comprises at least one processor and a non-transitory, computer-readable storage medium in operable communication with the processor(s). The computer-readable storage medium contains one or more programming instructions that, when executed, cause the processor(s) to perform the method discussed above.

According to other embodiments of the present invention, a system for detecting cyber-attacks affecting a computing device includes a data access module, a statistical learning of signatures module, an online detection module, and one or more processors configured to execute the data access module, the statistical learning of signatures module, and the online detection module. The data access module is configured to retrieve a plurality of sensor datasets, each sensor dataset corresponding to involuntary emissions from the computing device in a particular modality. The statistical learning of signatures module is configured to extract a plurality of features from sensor datasets. The features may be extracted using physics-based models or a nonlinear convolutional network. This nonlinear convolutional network may comprise, for example, one or more of a scattering network and a semi-discrete convolutive network. In some embodiments, the statistical learning of signatures module is further configured to fuse features derived from each particular modality. The online detection module applies one or more statistical models to features to identify one or more events related to the computing device. Additionally, the online detection module applies a domain-specific ontology (e.g., web ontology language) to designate each of the one or more events as benign, failure, or a cyber-attack.

In some embodiments, the statistical learning of signatures module may be further configured to use a deep propagation network (e.g., a restricted Boltzmann machine) to fuse features derived from each particular modality. The system may be modified to support the operations of the deep propagation network. For example, the processors included in the system comprise graphical processing units which are configured to execute operations associated with the deep propagation network in parallel.

Some embodiments of the aforementioned system include a plurality of sensors configured to retrieve the sensor datasets. Each sensor is separated from a computing unit holding the one or more processors by an air gap. These sensors may include, for example, one or more of an acoustic sensor, a video sensor, a thermal sensor, an electromagnetic sensor, and a radiofrequency sensor.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to critical infrastructure forensics. Briefly, the techniques described herein provide a transformative cyber-attack detection paradigm to enhance the protection of Embedded and Mission-Specific Devices (EMSDs) used in Critical Infrastructure Components (CIC). The system, referred to as Critical Infrastructure Forensics (CIF), is based on the observation that changes in the cyber domain (e.g., parameters, firmware, function blocks, machine-specific instructions) are often manifested physically (e.g., increase in RPM, pressure) in the hardware they control (e.g., motor, transformer, process valve). These physical effects have associated unintended emissions referred to as "trails" such as noise, vibration, motion, heat, electro-magnetic (EM) interference, and radio frequency that a CIC leaves behind. Therefore, these trails create distinctive signatures in space and time that can be used as reliable discriminators to characterize specific cyber-events executed in the EMSDs. Thus, detection can be achieved by comparing the signatures of a CIC in operation against a database of ground truth signatures obtained a-priori, e.g., during manufacturing representing the nominal and failure mode (e.g., mechanical fault) behavior of the uncompromised CIC. Existing approaches that observe the EMSDs directly may not be very effective for CICs where there is a large amount of environmental noise and EMSDs are often shielded.

Figure 1:
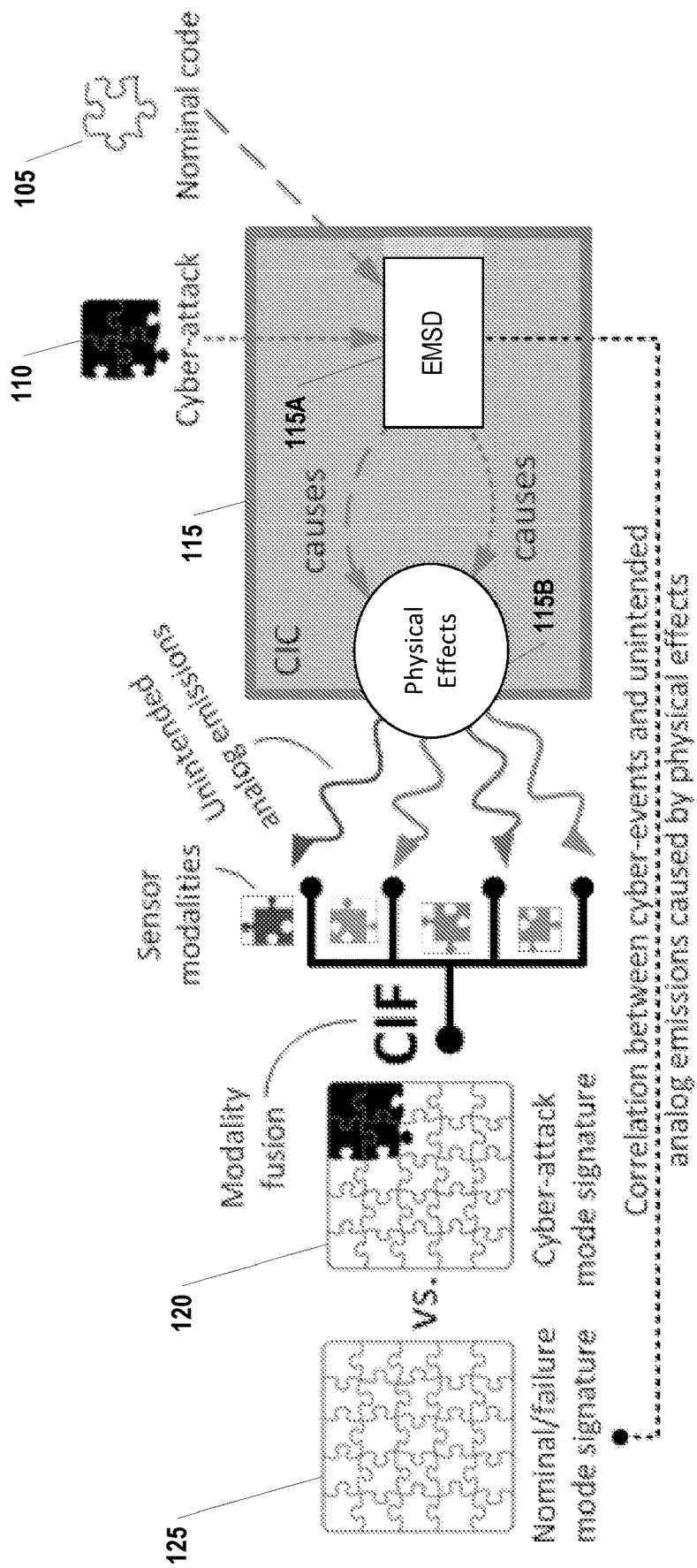
FIG. 1 provides a high-level overview of how CIF characterizes CICs through the unintended emissions from physical effects caused by Embedded and Mission-Specific Devices (EMSDs), according to some embodiments.

FIG. 1 provides a high-level overview of how CIF characterizes CICs through the unintended emissions from physical effects caused by EMSDs, according to some embodiments. Here, an EMSD in a CIC executes Nominal Code 105 as well as Cyber-attack Code 110. Each type of code causes Physical Effects 115B including unintended analog emissions in modalities such noise, vibration, motion, heat, EM interference, radio frequency, etc. One or more sensors are configured to acquire these emissions. A CIF system then fuses the acquired emission data and generates signatures of the CIC 115. FIG. 1 shows two different signatures: a Nominal/failure Mode Signature 125 that indicates when the CIC 115 is executing only Nominal Code 105 and a Cyber-attack Mode Signature 120 that executes a combination of Cyber-Attack Code 110 and Nominal Code 105. Using these signatures 120, 125, the EMSD 115A thus correlates between cyber-events and unintended analog emission caused by physical effects.

Figure 2:
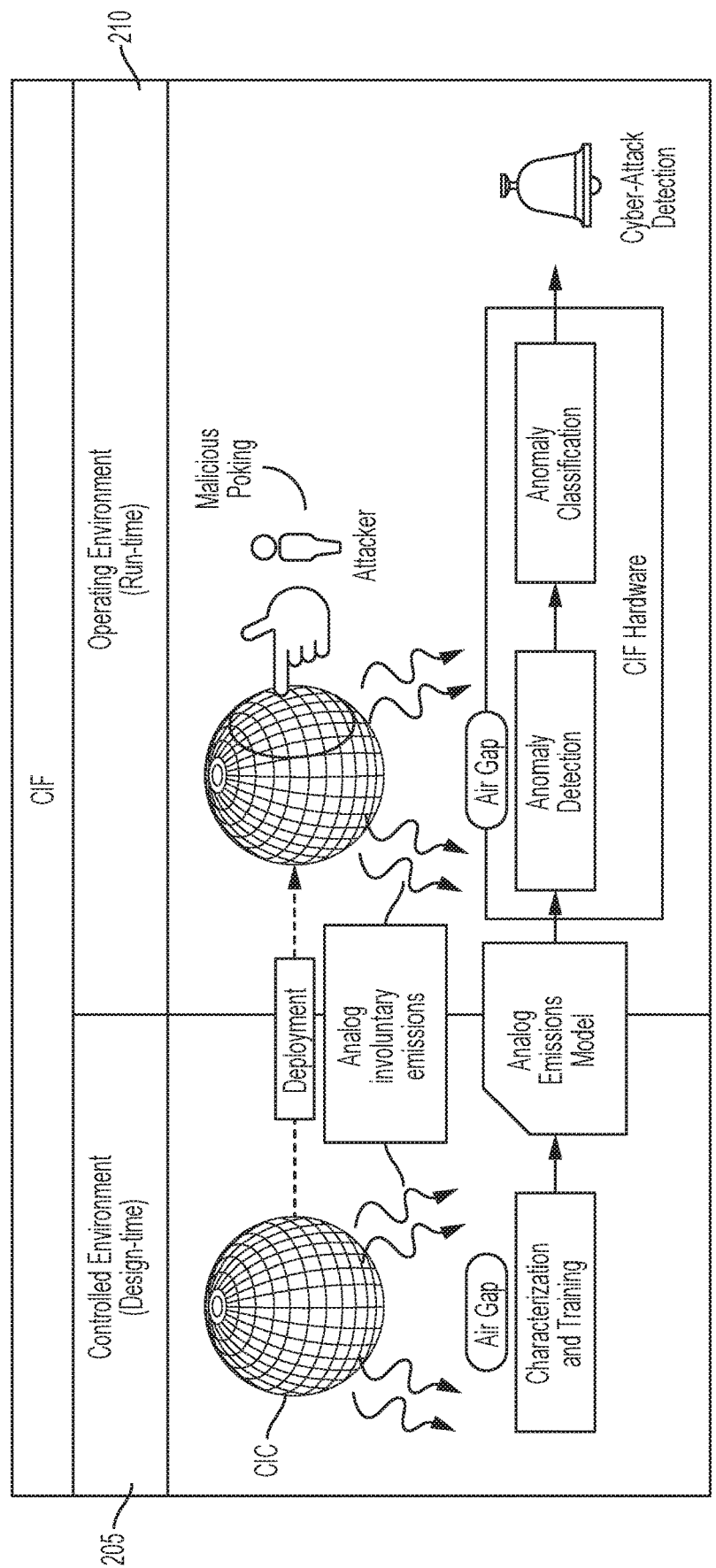
FIG. 2 illustrates CIF characterization and detection, as it may be applied in some embodiments.

FIG. 2 illustrates CIF characterization and detection, as it may be applied in some embodiments. FIG. 2 is divided into a Design-Time Controlled Environment 205 and a Run-time Operating Environment 210. In the Design-Time Controlled Environment 205, analog involuntary emissions from a CIC are used to perform characterization and training in order to generate an analog model. In the Run-time Operating Environment 210, the analog emissions model is used on CIF Hardware is used to perform anomaly detection and anomaly classification in order to detect a cyber-attack.

CIF goes beyond the state-of-the-art with non-intrusive analog sensing where acoustic, thermal, video, EM, and radio frequency modalities are exploited for cyber-security. The approach discussed herein significantly differs from intrusive methods and it has a much higher degree of complexity due to the non-intrusive nature of our modalities. CIF looks at non-intrusive physical indicators with new eyes and makes available a detection mechanism. It measures and identifies cyber-attacks via multiple physical means that are difficult to spoof and it provides intelligence that confirms the more traditional sources. At the same time, it can detect things that other sensors cannot sense, or be the first sensor to recognize a potential critical insight. CIF analyzes non-intrusive physical indicators with new eyes and makes available the detection mechanism shown in FIG. 2. It measures and identifies cyber-attacks via multiple physical means that are difficult to spoof and it provides intelligence that confirms the more traditional sources. At the same time, it can detect things that other sensors cannot sense, or be the first sensor to recognize a potential critical insight.

Various techniques may be applied to optimize CIF for real-world applications. To overcome signal attenuation, CIF may focus on the most prominent (in signal strength) modalities emitted by CICs that can be captured non-intrusively, some of which are not sensitive to attenuation (i.e., video and thermal). To better understand the correlations between modalities and their connection to source code, a sensor fusion with a deep learning approach may be applied, assisted by physical models created and tuned by domain experts. Additionally, systems such as proprietary motion control, process control, and industrial control code deployed in the CICs may be leveraged in understanding the correlations between emissions to code.

Knowledge in CICs may be used to provide an ontology that enables CIF to correctly classify cyber-attacks and differentiate with respect to benign or failure mode signatures. Various state of the art techniques may be applied to separate signals from noise. For example, for real time acoustic source separation, very large scale microphone arrays may be used in order to drastically improve signal-to-noise ratio and focus on the sources of interest. Additionally, to detect cyber-attacks in a very short time (e.g., within milliseconds), physical anomalies caused by both internal (compromised system) and external (uncompromised system under attack) stimuli can be proactively examined.

Figure 3:
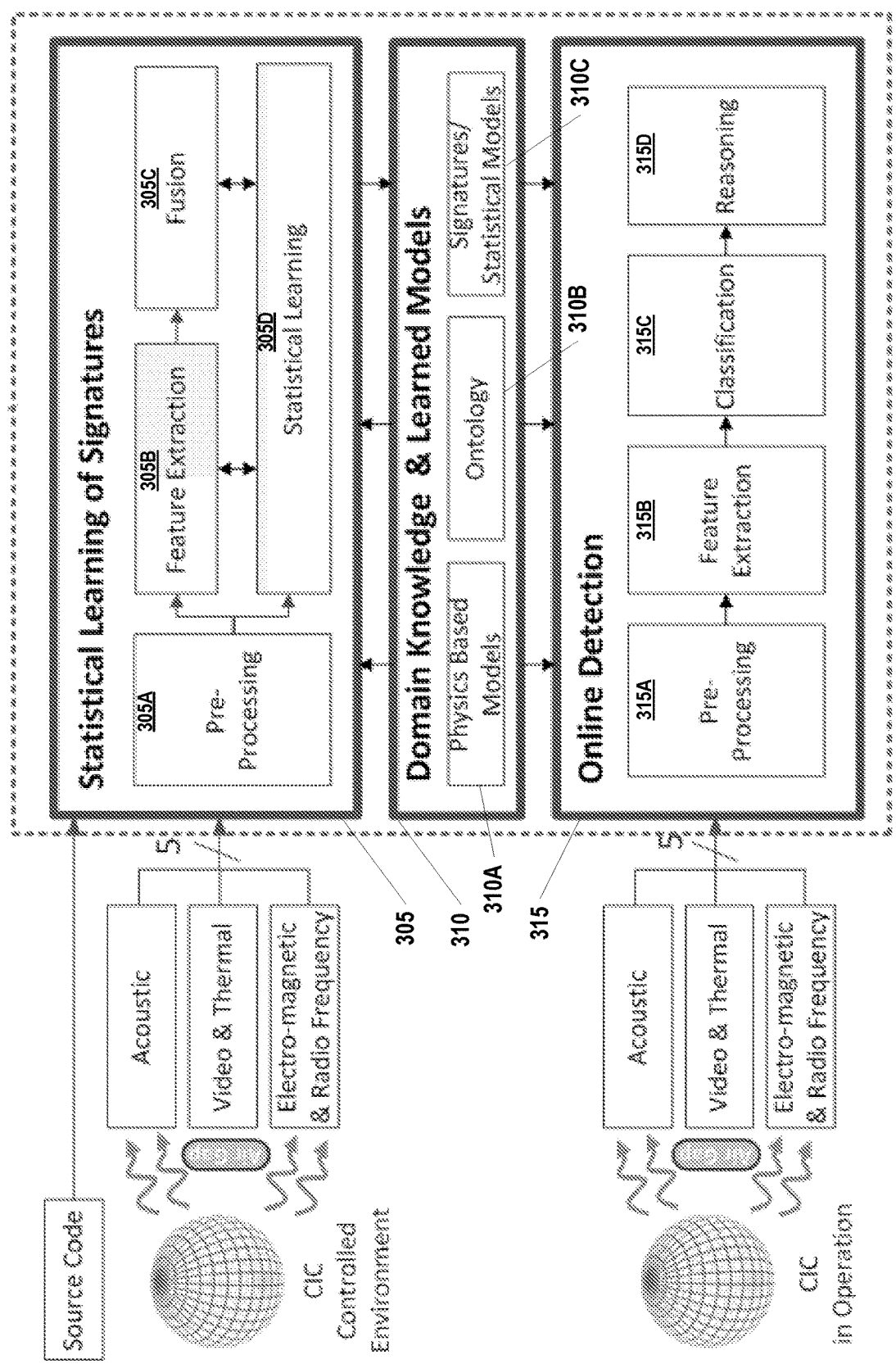
FIG. 3 shows a CIF system architecture comprising offline statistical learning of signatures, various domain knowledge and learned models, and online detection.

FIG. 3 shows a CIF system architecture 300 comprising offline statistical learning of signatures, various domain knowledge and learned models, and online detection. The main technology components of CIF architecture 300 in this example are the 4 sensing modalities (acoustic, video & thermal, EM and radio frequency), the Statistical Learning of Signatures Block 305, the Domain Knowledge and Learned Models Block 310, and the Online Detection Block 315. CIF enables the definition of a collection of signal modalities and signal experts: acoustic, video and thermal, EM and radio frequency, and others. A key feature across these modalities is the algorithms to correlate the source code executed in the EMSDs to physical effects and involuntary emissions. The Statistical Learning of Signatures Block 305 in particular enables the combination of multiple heterogeneous modalities for feature extraction, fusion, and statistical deep learning to create signatures. This process is supported by physics-based models created and tuned by domain-experts. The Online Detection Block 315 provides the timely detection of cyber-attacks using a domain-specific ontology to distinguish between benign, failure, and cyber-attack modes. Each of these various components are described in more detail below.

The Statistical Learning of Signatures Block 305 of architecture 300 performs learning, targeting two criteria in dealing with fusion of multi-modality emissions applied to the difficult problem of discrimination of cyber events: (1) flexibility in the use of sensor information, from simple measurements to complex features made available by specialized hardware and algorithms for EM, images, or acoustics; flexibility in configuring and testing representations and computational pipelines to support the best choice of yet-to-be-defined algorithms and parameterizations; last but not least, flexibility in dealing with uncertain evidence and inferences; (2) scale-up to large dimensionality problems and very large amounts of input data, made available by easy sensing and data acquisition, capability to organize and store data and labels, accelerated hardware capabilities to perform feature extraction and learning in high-dimensional spaces using standardized learning procedures.

A Pre-Processing Module 305A receives or retrieves the data from the various modalities and extracts relevant information from the data, as necessary. Additionally, in some embodiments, Pre-Processing Module 305A covers the homogenous datasets into a common data format. The Pre-Processing Module 305A may use standard Application Programming Interfaces (APIs) from sensor manufactures to receive and retrieve data or, in some instances, custom interfaces may be developed and used.

A Feature Extraction Module 305B then extracts feature from data. Examples of features that can be extracted from pre-processed raw data include variance, skewness, kurtosis or other high moments in the data, peak-to-peak ratio, crest factor, zero-crossing rates (from the time domain), power in various frequency bands of interest, or magnitudes at fundamental frequencies (frequency domain), specific domain-independent (wavelet, scattering networks) or domain-dependent (independent components) transformations, cepstral coefficients or other filters applied in cascade on previous features.

In some embodiments, the Feature Extraction Module 305B is configured to extract the "best" features that satisfy the following conditions: (1) achieving highest discrimination between classes by capturing most information in the data, and; (2) achieving highest robustness to deformations and noise within any given class. These conditions could be automatically learned or selected from a very large set of possibilities provided that calibrated field or laboratory test data exists (possibly from controlled experimentation), where data is carefully annotated with conditions how it was recorded. This is not always possible. Furthermore, the number of parameterizations to filter data in order to extract appropriate features could be daunting. Both feature optimality criteria presented above are hard to meet simultaneously.

In some embodiments, the Feature Extraction Module 305B performs feature extraction into "raw features" using two additional strategies: employ scattering transforms and exploit physics-based models as is shown in FIG. 3. Below we describe the first approach. The next section will describe the use of physics-based models.

In addition to standard analysis blocks (e.g., short-time Fourier transforms, wavelet transforms, principal component analysis, independent component analysis, etc.), non-linear convolutional networks such as scattering networks and semi-discrete deep convolutive networks may also be applied by the Feature Extraction Module 305B. The scattering transform is:

$$S[q]x = U[q]x * \Phi_j$$

where the scattering propagator $U[q]x$ is given by:

$$U[q]x = |\mu x * \Psi_{\lambda_1}| * \Psi_{\lambda_2}| \ldots \Psi_{\lambda_m}|$$

for a path $q=(\lambda_1, \lambda_2, \ldots, \lambda_m)$ with a fixed low-pass filter $\phi_j(t)$ and several band-pass filters $\Psi_A(t)$. An illustration of the scattering transform is provided in FIG. 3. When $(\phi_j, \Psi_{A_1}, \Psi_{\lambda_2}, \ldots, \Psi_{\lambda_m})$ are associated to a special wavelet frame, such a structure is robust to small-scale deformations (in addition to translations) while mapping one to one and preserving the total energy of the input signal. The output of the scattering transform is thus discriminative between inputs of different classes while being relatively insensitive to intra-class variations. In some embodiments, the robustness results may also be extended to the case of more general filter banks by restricting the input signals to the class of band-limited functions.

The deep convolutive networks may be especially suitable to video and audio signals. In some embodiments, the Feature Extraction Module 305B is optimized for each modality in two stages: first the optimization is performed separately using a discriminative and robustness criterion (such as the separation bounds of an SVM); and second the Feature Extraction Module 305B is fine tuned in conjunction with the Fusion Module 305C and Statistical Learning Module 305D. The input to the Feature Extraction Module 305B is the preprocessed signal x. Its output $S[q]x$ is quantized into a binary vector v and merged with binary vectors of other modalities and is fed into the Fusion Module 305C.

The CIF architecture 300 is able to use multi-modal signatures to detect cyber abnormalities. The link between multi-modal signatures and cyber abnormalities is often not apparent. The architecture 300 uses two different methods to address abnormality detection.

Figure 5:
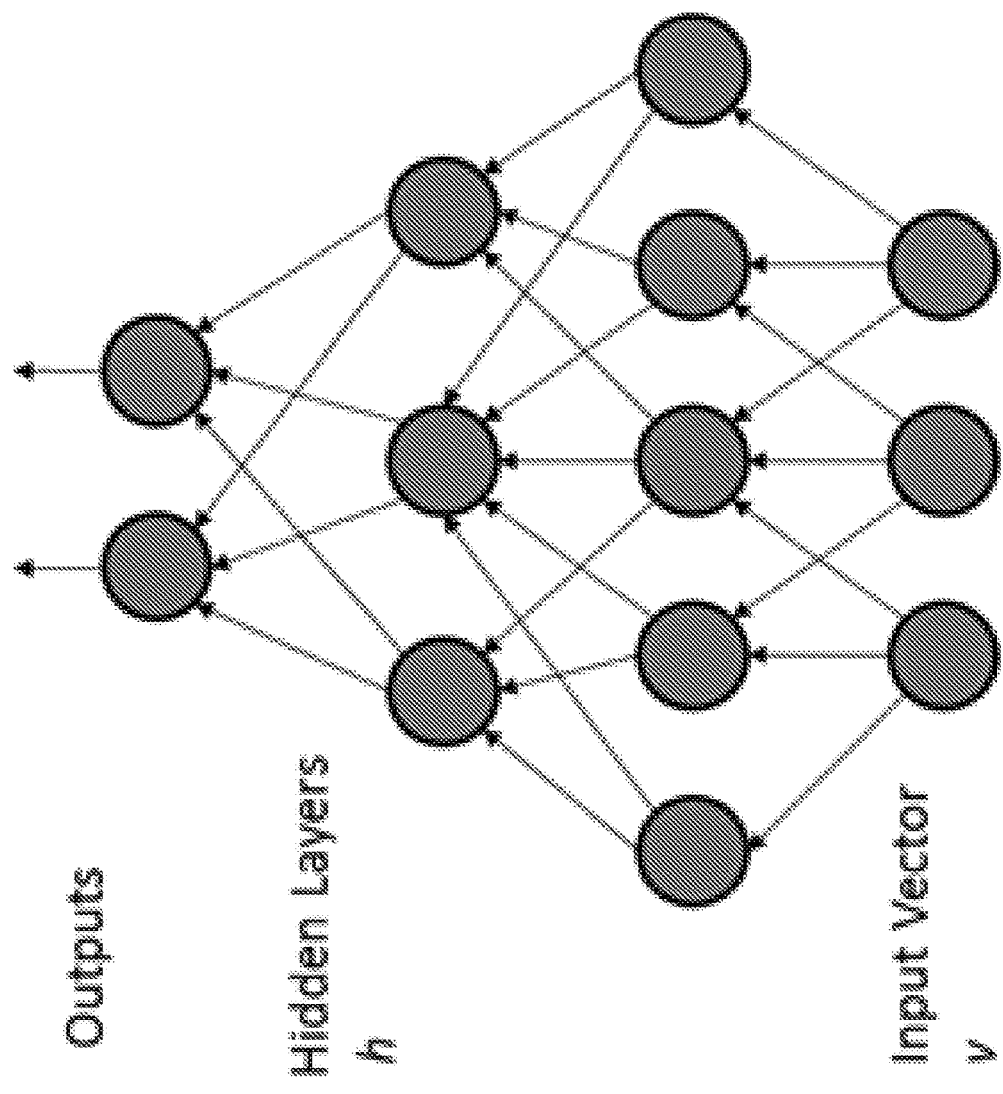
FIG. 5 provides an example of a deep propagation network, according to some embodiments.

In some embodiments, the Feature Extraction Module 305B is used in conjunction with the Fusion Module 305C to fuse heterogeneous modalities in a statistical principled manner. More specifically, deep propagation networks such as Boltzmann machines are used to model the distribution (v; θ), where v is the binary vector obtained by merging multiple binary feature vectors, and θ is a set of parameters. An example deep propagation network is shown in FIG. 5. First the feature vectors computed by the Feature Extraction Module 305B are quantized into a binary vector denoted v. The Fusion Module 305C computes the conditional probability distribution p=p(h|v) of the hidden nodes (h: unobserved random health state variables) given the visible nodes (v: observed random signal signatures), which is subsequently used by the decision/reasoning block to estimate the system. The collection of system states is typically a small set that can include 'normal operation', 'mechanical failure', 'electrical failure', 'cyberattack' etc. The core of Fusion Module 305C in these embodiments is a restricted Boltzmann machine (RBM), which is a graphical representation of statistical dependencies between visible and hidden nodes. RBMs provide a flexible trade-off between model accuracy and computational complexity. The RBM assumes the existence of a set of hidden nodes whose statistical dependencies are responsible for the overall state of the system. It assumes further that there are no dependencies between hidden nodes within the same layer, and that the joint distribution is given by:

$$p(v, h; \theta) = \frac{1}{Z(\theta)} \exp\{-E(v, h; \theta)\} \quad (E1)$$

where the energy $E(v,h;\theta)$ is given by a quadratic form:

$$E(v,h;\theta) = -v^T W_1 h - h^T W_2 h + v^T a + h^T b \quad (E2)$$

with a parameter set $\theta = \{W_1, W_2, a, b\}$ and a partition function $Z(\theta) = \Sigma_{v,h} \exp\{-E(v,h;\theta)\}$. Here $W_1$ and $W_2$ are matrices, with $W_2$ partitioned in blocks, that allow interaction only between nodes of adjacent hidden layers, and a, b are vectors that define bias terms. Using Eq. (E1), this block outputs the posterior distribution $p=p(h|v)$ of the hidden states given the measured signal x (and hence v).

The parameters may generally be learned during off-line training periods. The training phase outputs two pieces of information: the set of parameters θ obtained by maximizing the likelihood of data v; conditional distribution patterns of the last layer hidden nodes, for those subsets of labeled training datasets. The optimal parameters together with conditional distributions of the last layer of hidden nodes form the statistical signatures used by the online classifier (see FIG. 3). Second, additional reasoning will be performed on simpler multi-modal signatures in order to solve the puzzle of a cyber-attack, by combining all the pieces of evidence together.

A Statistical Learning Module 305D defines statistical models for the variables of interest, as determined to be optimal for the class of events to be characterized. These statistical models additionally capture in a principled way the uncertainty inherent to the data describing the operation of the component based on multiple modalities. This is important at the module level, in order to make it possible to pull together evidence. The model to capture uncertainty is fully addressed above with reference to the Fusion Module 305C.

The Domain Knowledge and Learned Models Block 310 provides domain knowledge (e.g. for CIC such as a 3D printer, valve system, or robotic system) using physics-based models to describe the CIC behavior and using ontologies to capture symbolically specific knowledge such as the naming of entities, their interrelationships (part-of), properties, and types. Statistical learning creates additional models that will be used at run-time for classification and prediction.

Model-based forecasts or predictions are the preferred approach to CIF, where both data scientists and domain engineers are brought to bear on the problem of feature extraction and data analysis. "Model-based" typically refers to approaches using models derived from first principles, which use mathematical models of system behavior. Stiffness can be assessed, for example, using a multi-body structure and physics simulation of the mathematical equations describing it. Because this is available, knowledge from such known physical laws will be used to develop models that can constrain (and therefore help) in the process of explaining the measured sensor data. Furthermore, when data is not readily available but the model has been validated, a large amount of synthetic data can be additionally made available. Importantly, this works for both nominal (normal) and degraded (or faulty) behaviors. Specific models can be learned or tuned from the data, when large data sets are available, for nominal or fault modes.

CIF exploits Physics-Based Models 310A of physical system components (e.g. electro-magnetic or mechanical components, such as rotor, stator, magnet, generators or bearings, springs, wheels, etc.). These models offer cues from unconventional physical traces that increase the capabilities of the system to operate even though it has not been trained with specific cyber-attack sequences of events and distinct behaviors present in such cases. The CIF system will thus be able to detect abnormalities for unforeseen system input conditions.

The Physics-Based Models 310A can be employed in multiple ways. In some embodiments, model features (e.g. describing the system state) that will be merged with statistical feature are extracted. These can be used to define comprehensive signatures, jointly with statistically oriented features from the respective modality (or multiple modalities) at learning and prediction time. Assuming that the model (as given by differential equations etc.) is tuned to the data in a training phase, the residuals in how the model explain the real data can be used for specialized features. These, in turn, can be merged with statistically oriented features from the respective modality at learning and prediction time. The Physics-Based Models 310A defines separate domain dependent cues that will be assembled together with data-driven signatures and cues at reasoning time.

CIC providers have engineering knowledge in various verticals of interest to CIF (e.g. industrial automation employing robotics, control systems and a variety of drives, motors, mechanical and electrical systems; service and manufacturing in industrial, energy, automation domains). A use case from these areas will be chosen to specify symbolic domain specific knowledge covering the naming of entities, their properties and interrelationships (e.g. for a particular machine like a 3D printer or an automation pipeline including robotics). CIF captures this knowledge using the ontology formalism, as shown in Ontology 310B of FIG. 3. The goal is to encode knowledge and connect it to numerical evidence provided by classifiers and abnormality detectors (e.g. evidence for a category in the input data, and the likelihoods associated with different statistical interpretations of what the input data shows).

Classifiers and detectors analyze data statistically as a function of numerical features. The knowledge allows us to further search for information or context evidence in a logical manner using logical inference formalisms such as description logic. The organization of knowledge as the Ontology 310B makes it amenable to automatic processing using logic in order to correlate pieces of evidence. This will also allow human users to make connections among the results of component-wise classification and the results inferred by the statistical classification system. The Ontology 310B can be expanded in some embodiments to reason about the needed sensor information e.g. signal sampling frequency and resolution, signal type, i.e. electrical, vibration, acoustic, or thermal, what makes sense to be correlated in multi-modal analysis, and interpretations of the cyber-attack detection system. The comprehensive CIC the Ontology 310B may be generated with input from domain experts in the project team for the specific use case to be addressed.

For testing, the robustness of several of the approaches introduced for specific modalities may be statistically and mathematically analyzed as a function of the underlying CIC physics equations. Physics-based features can then be used for learning statistical models of various conditions of interest for CIC. These may be compared against statistical and generative models. Additionally, the physics-based features can be used to control the definition of failures modes. The architecture 300 can then be employed for generating both nominal and fault synthetic data. CIF can use the web ontology language (OWL) or a similar language to define description logic-based profiles for CIC examples of interest (consisting of classes of objects, their equivalence or disjointness, and their properties).

The Online Detection Block 315 is concerned with predictions, reasoning, and explanations about the state of the CIC. In general, this block uses the same pre-processing and feature extraction techniques as the Statistical Learning of Signatures Block 305. Thus, the Pre-Processing Module 315A and the Feature Extraction Module 315B are functionally equivalent, or at least provide similar functionality, to the Pre-Processing Module 305A and Feature Extraction Module 305B, respectively. The resulting feature or data vectors from the Pre-Processing Module 315A and the Feature Extraction Module 315B are used as inputs to a Classification Module 315C.

The fundamental classification technology used broadly in the Classification Module 315C is part of the mainstream machine learning practice today, and is based, first on well-studied and formalized techniques using one-class or multi-class support vector machines and second on deep learning. Statistical learning and fusion models (as described in reference to Block 305), created for components and variables in the CIC ontology, may be used for classification during online operation. Statistical classifiers indicate factual information about the analog input conditions such as the input class in the data and its certainty, out-of-class (or abnormal conditions), or simply hypothesize the state of the overall CIC system (e.g. normal, failure, cyber-attack). Correspondingly, the models will be used for classification, during online operation, at run time. The statistical models and classifiers will work, accordingly, to seek an input class in the data, to detect out-of-class conditions, or to exploit the generative models to explain the data (e.g. normal, failure, cyber-attack) that can be used later on with labeled data (possibly coming from conclusions with a high degree of certainty) for classification.

The output of the Classification Module 315C is used as input to a Reasoning Module 315D. The various input data sources may result in classifications that conflict with one another. For example, the fused time series may show that high heat along with increased vibration and sound at the same time relates to mechanical failure, and high heat without vibration or sound relates to an electrical failure. These facts plus domain knowledge encoded in the ontology will be used by the reasoning module to resolve conflicts and assess states as likely cyber-attacks. The overall system is characterized by many variables (some observable through sensor measurements), parameters (as given by physics-based models). It will infer abnormalities in signatures, indicators for various components, and compute classifications. The reasoning part has the role of putting it all together, with assistance from human users, or automatically. The latter is possible by reasoning with the ontology of the domain defined in the previous section.

Figure 4:
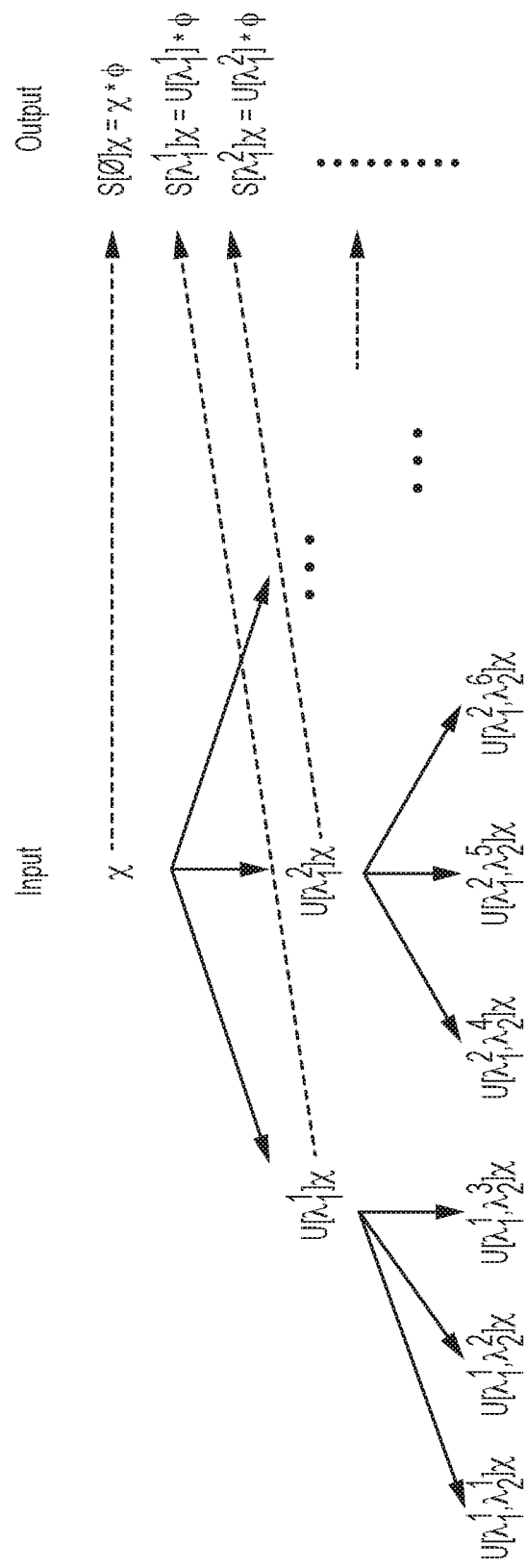
FIG. 4 provides an example of a scattering transform, according to some embodiments.
Figure 6:
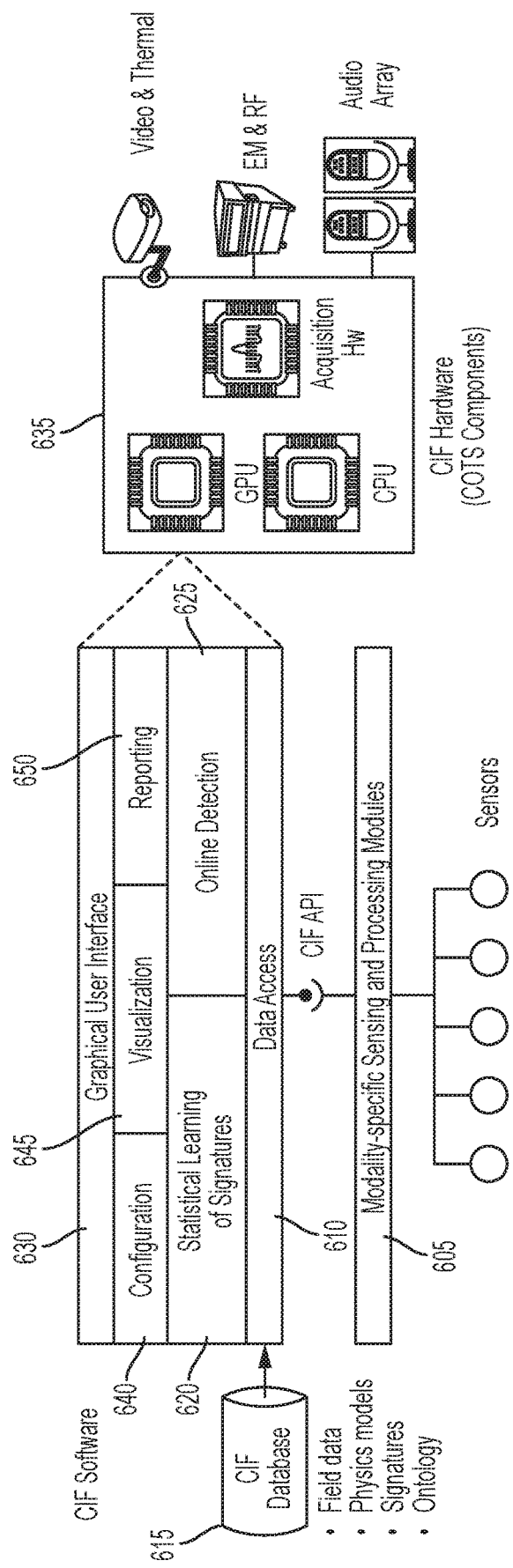
FIG. 6 provides an example software and hardware architecture that may be applied in some embodiments.

FIG. 6 provides an example software and hardware architecture that may be applied in some embodiments. The Modality-specific Sensing and Processing Modules 605 are delivered as binaries. The rest of the modules may be delivered as source code and compiled (or interpreted) locally. The Data Access Module 610 manages the sensor data coming from the sensors and modality-specific algorithms, the CIF database 615, and the Statistical Learning of Signatures Module 620 and Online Detection Module 625. The CIF database 615 may be, for example, a NoSQL database to store time series field data, physics models, signatures, and the ontology. The Statistical Learning of Signatures Module 620 comprises the system-level Feature Extraction, Fusion, and Statistical Learning algorithms discussed above with reference to FIG. 4. The Online Detection Module 625 comprises classification and reasoning algorithms discussed above. A Graphical User Interface Module 630 facilitates the interaction between users and the CIF Hardware 635 for configuration, visualization, and reporting. The Configuration Module 640 manages the parameterization and options for signature generation and online detection. The Visualization Module 645 provides visual understanding of the phenomenology and signatures; this is useful for configuration, calibration, and optimization of CIF. The Reporting Module 650 will provide the performance and accuracy for the various algorithms and components of CIF. As shown in FIG. 6, the architecture of the CIF Hardware 635 comprises the modality-specific sensors and hardware, a high-performance commercial off-the-shelf (COTS) computer hosting a high-end acquisition board, CPU, and GPUs optimized for deep learning applications.

The processors described herein as used by control devices may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation, the control layer devices and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio wave and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

The invention claimed is:

1. A computer-implemented method for detecting cyber-attacks affecting a computing device, the method comprising:
retrieving a first plurality of sensor datasets with heterogeneous modalities from a plurality of multi-modal sensors during a training phase and a second plurality of sensor datasets with heterogeneous modalities from the plurality of multi modal sensors during an online detection phase, each sensor dataset corresponding to involuntary emissions from the computing device in a particular modality;
extracting a first plurality of features from the first plurality of sensor datasets, wherein for each modality, a scattering transform of the sensor datasets is quantized into a binary feature vector and a deep propagation network is used to merge the binary feature vectors, producing statistical signatures comprising a set of parameters obtained by maximizing likelihood of the binary feature vectors and conditional distribution patterns of a last layer of hidden nodes in the deep propagation network;
extracting a second plurality of features from the second plurality of sensor datasets, wherein the second plurality of features is extracted using physics-based models;
applying one or more statistical models to the second plurality of features to identify one or more events related to the computing device; and
applying a domain-specific ontology to designate each of the one or more events as benign, failure, or a cyber-attack.

2. The method of claim 1, wherein the sensor datasets are each retrieved using a sensor that is external to the computing device and separated from the computing device by an air gap.

3. The method of claim 1, wherein the sensor dataset comprises data from one or more of acoustic, video, thermal, electromagnetic, and radiofrequency modalities.

4. The method of claim 1, wherein the plurality of features is extracted using a nonlinear convolutional network.

5. The method of claim 4, wherein the nonlinear convolutional network comprises one or more of a scattering network and a semi-discrete convolutive network.

6. The method of claim 1, further comprising:
during extraction of the plurality of features, using a deep propagation network to fuse features derived from each particular modality.

7. The method of claim 6, wherein the deep propagation network is a restricted Boltzmann machine.

8. A system for detecting cyber-attacks affecting a computing device, the system comprising:
a data access module configured to retrieve a first plurality of sensor datasets with heterogeneous modalities from a plurality of multi-modal sensors during a training phase and a second plurality of sensor datasets with heterogeneous modalities from the plurality of multi modal sensors during an online detection phase, each sensor dataset corresponding to involuntary emissions from the computing device in a particular modality;
a statistical learning of signatures module configured to extract a first plurality of features from the first plurality of sensor datasets, wherein for each modality, a scattering transform of the sensor datasets is quantized into a binary feature vector and a deep propagation network is used to merge the binary feature vectors, producing statistical signatures comprising a set of parameters obtained by maximizing likelihood of the binary feature vectors and conditional distribution patterns of a last layer of hidden nodes in the deep propagation network;
an online detection module configured to:
extract a second plurality of features from the second plurality of sensor datasets, wherein the second plurality of features is extracted using physics-based models,
apply one or more statistical signatures to the second plurality of features to identify one or more events related to the computing device, and
apply a domain-specific ontology to designate each of the one or more events as benign, failure, or a cyber-attack; and
one or more processors configured to execute the data access module, the statistical learning of signatures module, and the online detection module.

9. The system of claim 8, wherein the statistical learning of signatures module is further configured to fuse features derived from each particular modality to determine correlations between the modalities.

10. The system of claim 9, wherein the statistical learning of signatures module is further configured to use a deep propagation network to fuse features derived from each particular modality.

11. The system of claim 10, wherein the processors comprises a plurality of graphical processing units configured to execute operations associated with the deep propagation network in parallel.

12. The system of claim 10, wherein the deep propagation network is a restricted Boltzmann machine.

13. The system of claim 8, further comprising:
the plurality of sensors configured to retrieve the sensor datasets, wherein each sensor is separated from a computing unit holding the one or more processors by an air gap.

14. The system of claim 13, wherein the plurality of sensors comprise one or more of an acoustic sensor, a video sensor, a thermal sensor, an electromagnetic sensor, and a radiofrequency sensor.

15. The system of claim 8, wherein the plurality of features is extracted using a nonlinear convolutional network.

16. The system of claim 15, wherein the nonlinear convolutional network comprises one or more of a scattering network and a semi-discrete convolutive network.

17. The system of claim 8, wherein the domain-specific ontology is specified in web ontology language (OWL).

18. A system for detecting cyber-attacks affecting a computing device, the system comprising:
at least one processor; and
a non-transitory, computer-readable storage medium in operable communication with the processor, wherein the computer-readable storage medium contains one or more programming instructions that, when executed, cause the at least one processor to:
retrieve a first plurality of sensor datasets with heterogeneous modalities from a plurality of multi-modal sensors during a training phase and a second plurality of sensor datasets with heterogeneous modalities from the plurality of multi modal sensors during an online detection phase, each sensor dataset corresponding to involuntary emissions from the computing device in a particular modality;
extract a first plurality of features from the first plurality of sensor datasets, wherein for each modality, a scattering transform of the sensor datasets is quantized into a binary feature vector and a deep propagation network is used to merge the binary feature vectors, producing statistical signatures comprising a set of parameters obtained by maximizing likelihood of the binary feature vectors and conditional distribution patterns of a last layer of hidden nodes in the deep propagation network;
extract a second plurality of features from the second plurality of sensor datasets, wherein the second plurality of features is extracted using physics-based models;
apply one or more statistical models to the second plurality of features to identify one or more events related to the computing device; and
apply a domain-specific ontology to designate each of the one or more events as benign, failure, or a cyber-attack.

* * * * *